US012536925B1

(12) United States Patent
Yarborough

(10) Patent No.: US 12,536,925 B1
(45) **Date of Patent: *Jan. 27, 2026**

(54) SIGN WITH INSERTS

(71) Applicant: Maureen Yarborough, Collierville, TN (US)

(72) Inventor: Maureen Yarborough, Collierville, TN (US)

(73) Assignee: Sign Matters, Inc., Collierville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,513

(22) Filed: Dec. 12, 2023

Related U.S. Application Data

(63) Continuation of application No. 17/029,011, filed on Sep. 22, 2020, now Pat. No. 11,847,941.

(60) Provisional application No. 62/904,495, filed on Sep. 23, 2019.

(51) Int. Cl.
*G09F 7/18* (2006.01)
*G09F 7/10* (2006.01)

(52) U.S. Cl.
CPC .................. *G09F 7/18* (2013.01); *G09F 7/10* (2013.01); *G09F 2007/1873* (2013.01)

(58) Field of Classification Search
CPC ....... G09F 7/18; G09F 7/10; G09F 2007/1873
See application file for complete search history.

(56) References Cited

U.S. PATENT DOCUMENTS

| | | | | |
|---|---|---|---|---|
| RE14,178 | E * | 8/1916 | McCarrell | 434/395 |
| 2,093,598 | A | 9/1937 | Clark | |
| 3,592,469 | A * | 7/1971 | Glass | A63H 3/52 446/387 |
| 4,055,012 | A | 10/1977 | Cote | |
| 4,731,945 | A | 3/1988 | Howard | |
| 4,835,889 | A | 6/1989 | McClymonds | |
| 4,936,606 | A | 6/1990 | Moss | |
| 4,955,153 | A | 9/1990 | Albrecht | |
| 5,025,581 | A | 6/1991 | Polzin | |
| 5,161,343 | A | 11/1992 | Edwards | |
| 5,607,339 | A * | 3/1997 | Kramer | A63F 7/045 446/491 |
| 5,988,684 | A | 11/1999 | Blaustein | |
| 6,347,467 | B1 | 2/2002 | Meyer | |
| 6,385,876 | B1 | 5/2002 | McKenzie | |
| 6,475,054 | B1 * | 11/2002 | Liu | A63H 3/10 446/474 |
| 6,886,282 | B2 | 5/2005 | Sumner, III | |

(Continued)

*Primary Examiner* — David R Dunn
*Assistant Examiner* — Christopher E Veraa
(74) *Attorney, Agent, or Firm* — Nixon Peabody LLP

(57) ABSTRACT

A sign with the front comprising one or more image and/or text cut-outs. The cut-outs may be used in combination with non-cutout images or text, which can be printed or otherwise fixed to the front. A sleeve or holder is disposed on the back of the sign to receive and secure one or more inserts. Inserts may then be inserted and removed through the top opening. Images, colors, or patterns on the side of the insert facing the front of the sign can be seen through the cut-outs by a viewer of the sign, and appear to fill the respective portions of the cut-outs. Inserts may be changed out periodically to change the appearance of the sign without changing the cut-out images and/or text. Inserts may be changed out daily, seasonally, for holidays, and for special events or other reasons.

20 Claims, 30 Drawing Sheets

(56) References Cited

U.S. PATENT DOCUMENTS

| | | | |
|---|---|---|---|
| 8,172,270 | B2 | 5/2012 | Rossing |
| 8,956,000 | B2 | 2/2015 | Martinez |
| 2004/0123503 | A1 | 7/2004 | Pitzen |
| 2006/0026879 | A1 | 2/2006 | Tebaldi |
| 2006/0059747 | A1 | 3/2006 | Wescott |
| 2007/0124974 | A1 | 6/2007 | Lanier |
| 2009/0211137 | A1 | 8/2009 | Trantham |
| 2011/0239511 | A1 | 10/2011 | Wisniewski |
| 2013/0326922 | A1 | 12/2013 | Lyons |
| 2015/0181677 | A1 | 6/2015 | Martinez |
| 2016/0192791 | A1 | 7/2016 | Gao |
| 2020/0359812 | A1 | 11/2020 | Clores |

* cited by examiner

SIGN WITH INSERTS

This application is a continuation of U.S. application Ser. No. 17/029,011, filed Sep. 22, 2020, which claims benefit of and priority to U.S. Provisional App. No. 62/904,495, filed Sep. 23, 2019, both of which are incorporated herein in their entireties by specific reference for all purposes.

FIELD OF INVENTION

This invention relates to a sign with cut-out or transparent images and/or text with a sleeve for holding inserts to alter the background appearance within the cut-outs.

SUMMARY OF INVENTION

This invention relates to ap sign with the front comprising one or more image and/or text cut-outs. The cut-outs may be used in combination with non-cutout images or text, which can be printed or otherwise fixed to the front. A sleeve or holder is disposed on the back of the sign to receive and secure one or more inserts. Inserts may then be inserted and removed through the top opening. Images, colors, or patterns on the side of the insert facing the front of the sign can be seen through the cut-outs by a viewer of the sign, and appear to fill the respective portions of the cut-outs. Inserts may be changed out periodically to change the appearance of the sign without changing the cut-out images and/or text. Inserts may be changed out daily, seasonally, for holidays, and for special events or other reasons.

DETAILED DESCRIPTION OF EXEMPLARY EMBODIMENTS

Figure 1:
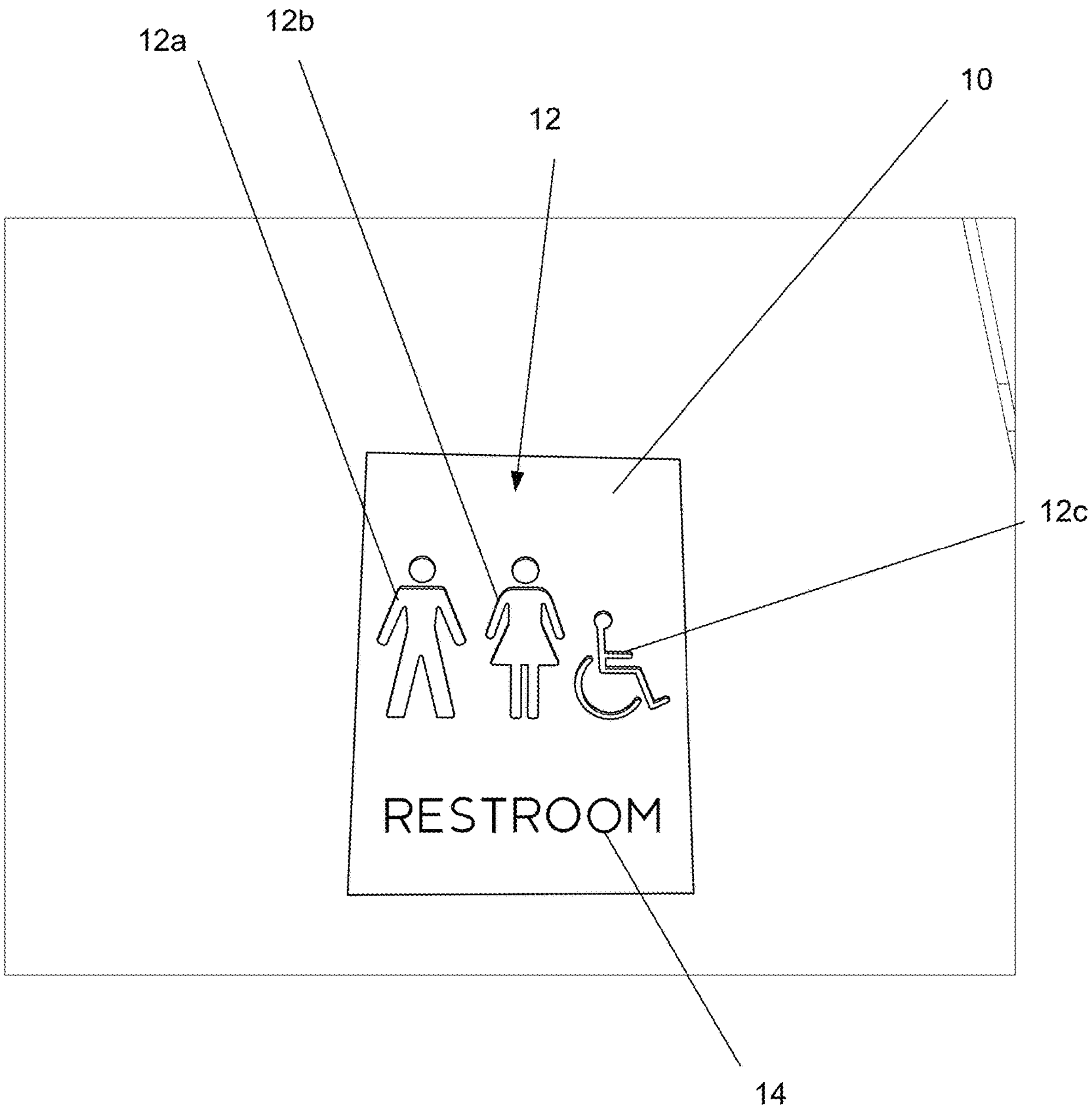
FIG. 1 shows an example of a sign with cut-out images and fixed text with no insert.
Figure 2:
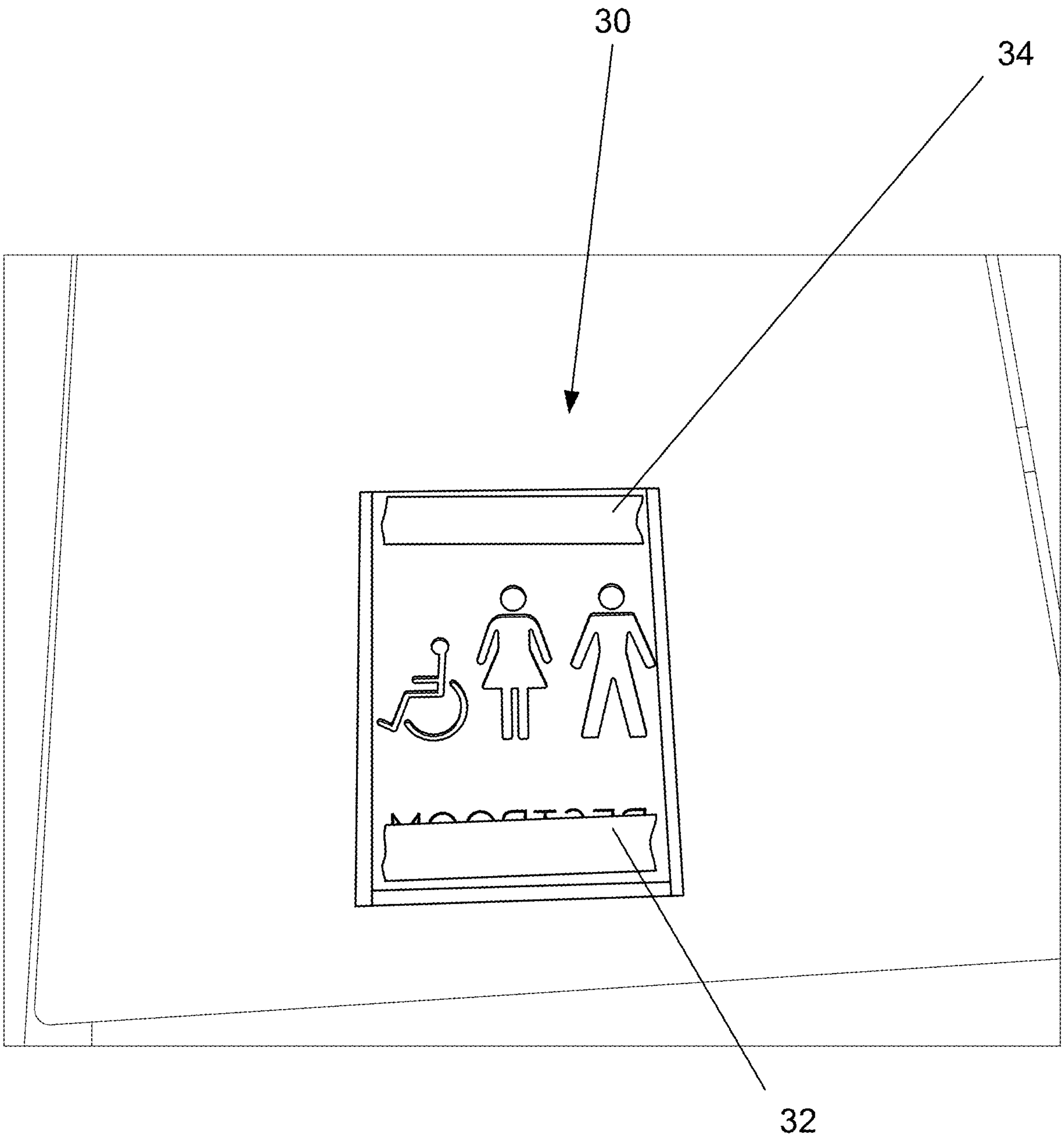
FIG. 2 shows a back view of the sign of FIG. 1 with a two-part sleeve.

In various exemplary embodiments, as seen in FIGS. 1-30, the present invention comprises a sign 10 with a front and a back, with the front comprising one or more images and/or text cut-outs 12 extending through the front, The cut-outs may be used in combination with non-cutout images or text 14, which can be printed or otherwise fixed to the front. FIG. 1, for example, shows a restroom sign with fixed and raised non-cutout text 14, with three cut-out images (i.e., man 12*a*, woman 12*b*, wheelchair 12*c*). Cut-outs images may be of any size or shape, including but not limited to circles, ovals, square, rectangles, hexagons, pentagons, octagons, other polygonal shapes, letters, numbers, words or phrases, humans, animals, trees, plants, furniture, machinery, or any form of image or design. The sign may be made of any suitable material known in the art: e.g., wood, plastic, acrylic, metal, paper, or other similar material. As described below, one or more inserts 20 are positioned behind the cut-outs and are visible therethrough.

In several embodiments, in place of or in addition to cut-out areas, the front of the sign may comprise one or more areas that are transparent 16, so that the inserts 20 may be visible therethrough, as described below. Other portions of the sign 10 may be colored or solid, with or without one or more fixed images or text (e.g., a room number 14*a*). A sign may comprise a combination of both cut-out areas, transparent areas, or transparent windows across some or all cut-out areas.

A sleeve or holder 30, or similar holding means, is disposed on the back of the sign to receive and secure one or more inserts. The sleeve or holder is open along the top and/or either side to allow the introduction and removal of inserts behind the sign. The sleeve/holder and inserts may be made of any suitable material, including, but not limited to, paper, tape with backer, cardboard, cellophane, plastic, acrylic, or the like. A single sleeve or holder may be provided on one sign, or multiple sleeves or holders may be provided on a sign. Accordingly, a single sleeve or holder may be used to provide an insert for a single cut-out or transparent window, or multiple cut-outs or transparent windows. Similarly, multiple sleeves or holders may be used to provide inserts for multiple cut-outs or transparent windows, and multiple sleeves or holders may be used to provide multiple inserts for a single cut-out or transparent window.

Figure 3:
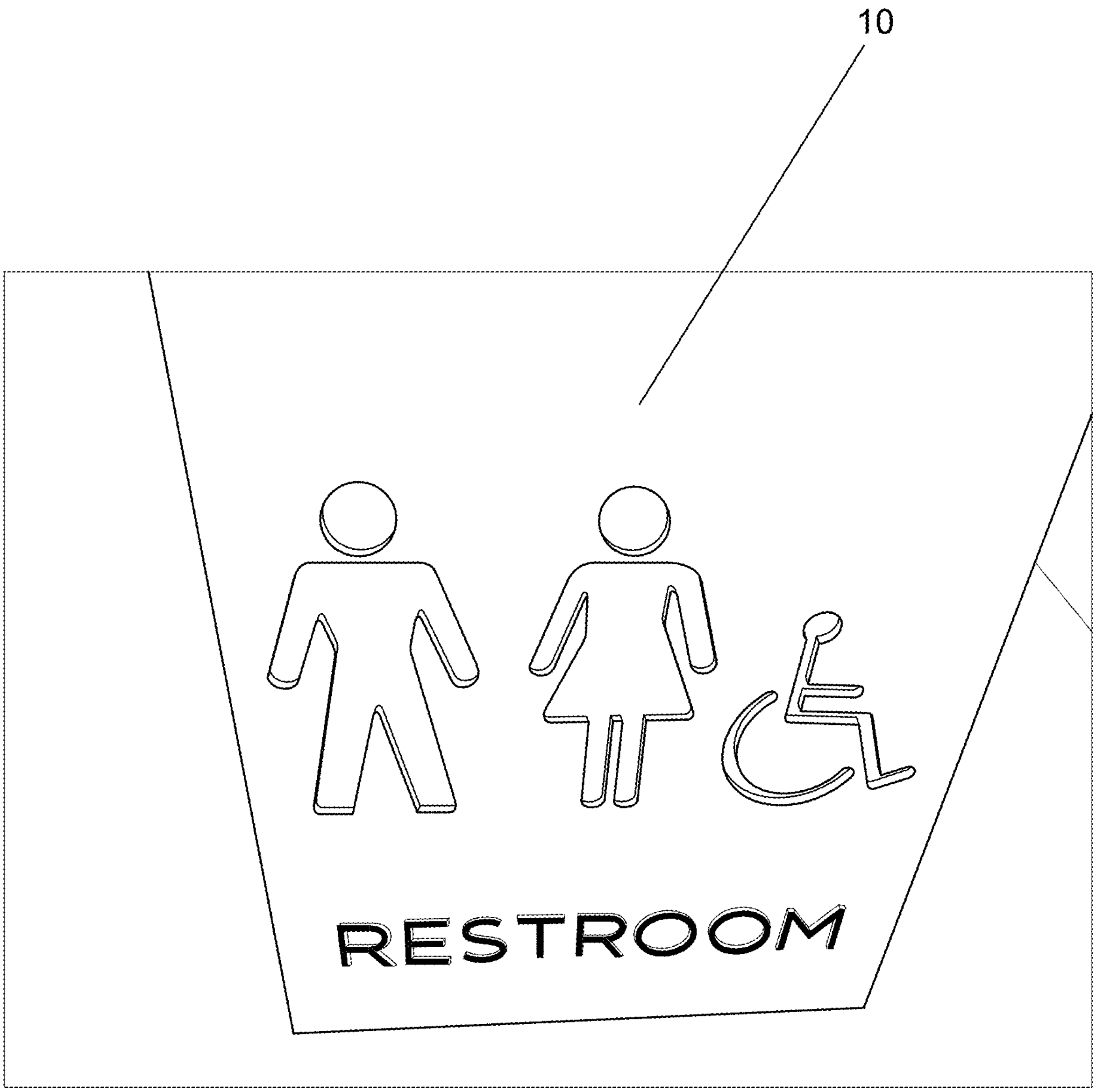
FIG. 3 shows a perspective front view of the sign of FIG. 1.
Figure 4:
FIG. 4 shows a view of an insert being inserted into the sleeve on a sign.
Figure 5:
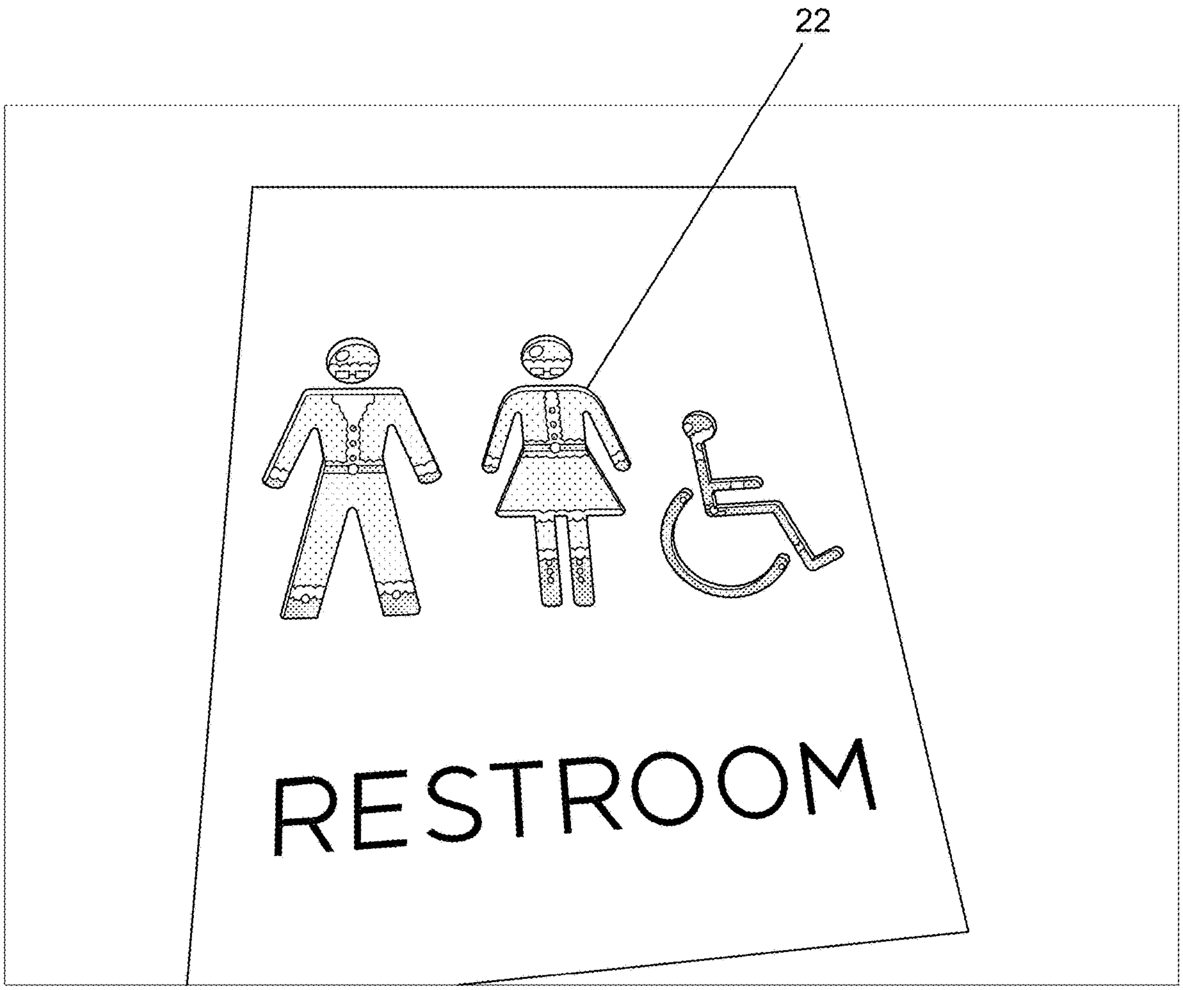
FIGS. 5-10 show front views of the sign of FIG. 1 with various inserts.
Figure 6:
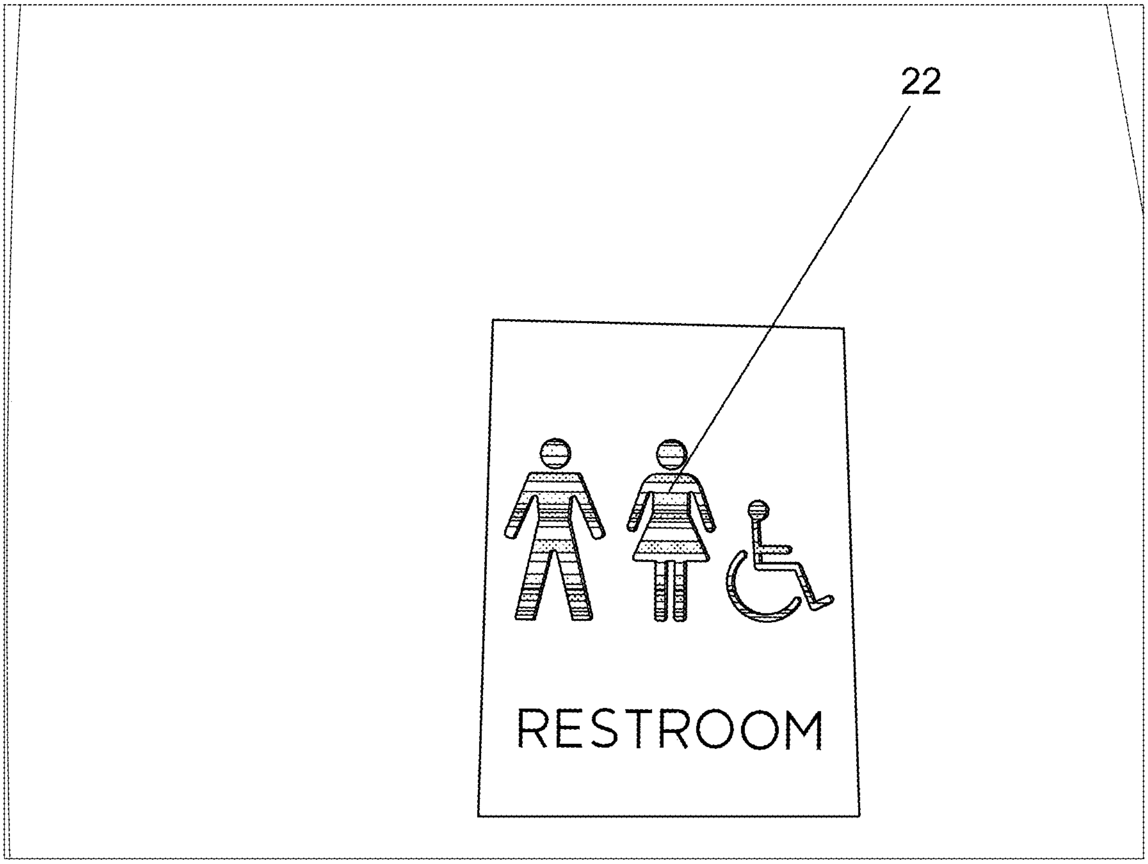
Figure 7:
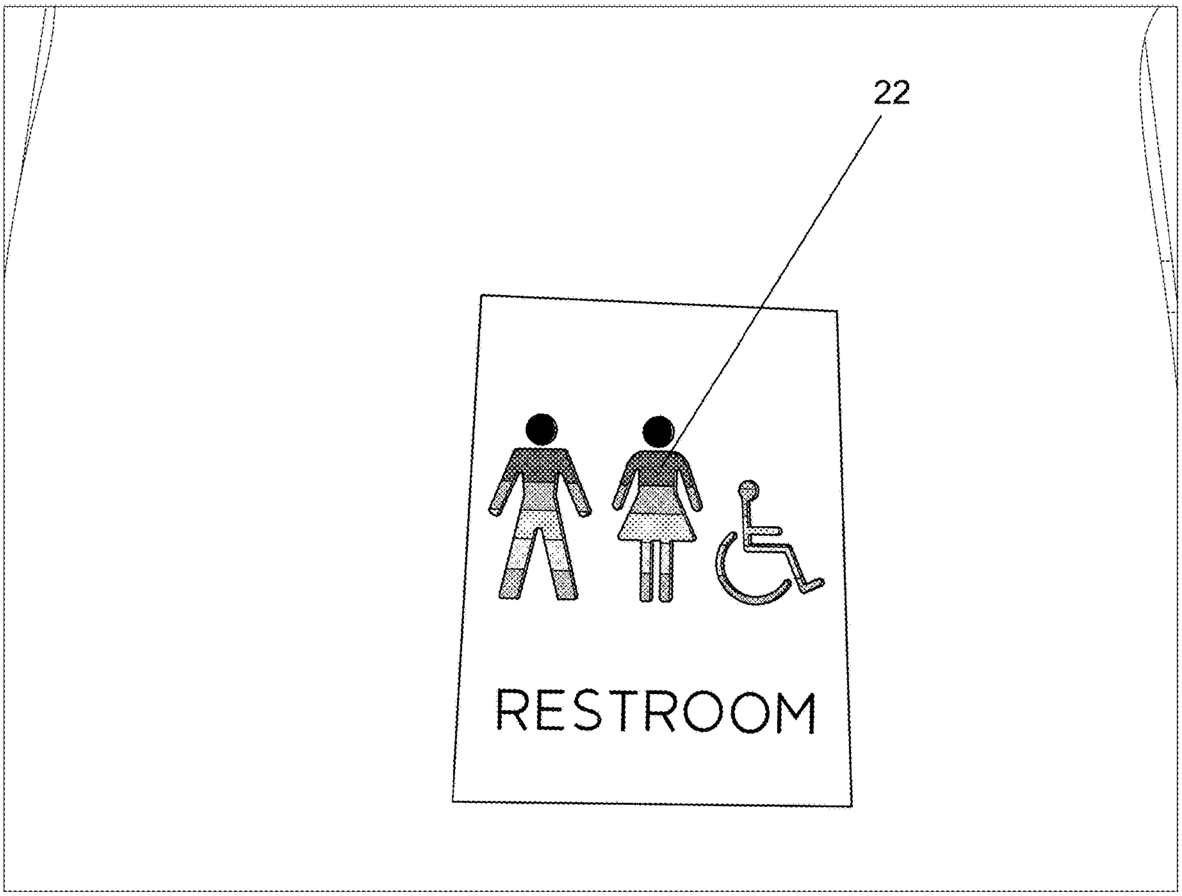

The sleeve or holder 30 may comprise a single flat panel extending from the bottom of the sign upwards for some or all of the sign, with an opening at the top. Inserts may then be inserted and removed through the top opening. In an alternative embodiment, the sleeve or holder may comprise multiple parts or components, such as a base holder affixed to the bottom of the back of the sign, with tabs or holders extending up along the sides of the back of the sign. In the embodiment shown in FIG. 2, the sleeve or holder on the back of the sign 10 comprises a base holder 32 with an upper holder 34, which extends between each side (or proximate to each side) of the sign and has an open top and bottom to allow the insert to pass through. One or more inserts (additional inserts may be placed behind the viewable insert as a storage location for easy changes) are inserted through the opening. FIG. 3 shows an insert 20 that has been partially inserted. For removal, the insert 20 can be pushed upward and/or outward by pressure on the insert from any bottom openings or through the cut-out figures, or by pulling or lifting from the top. The sleeve or holder 30 may be formed as a single piece with the sign 10, or may be separately and removably affixed to the sign.

Images, colors, or patterns on the side of the insert facing the front of the sign can be seen through the cut-outs by a viewer of the sign, and appear to fill 22 the respective portions of the cut-outs. Inserts may be changed out periodically to change the appearance of the sign without changing the cut-out images and/or text. Thus, inserts may be changed out daily, seasonally, for holidays (e.g., Christmas, Thanksgiving, Halloween, and so on), for special events or other reasons (e.g., matching company colors or branding), or to indicate a particular mood or feeling.

Figure 8:
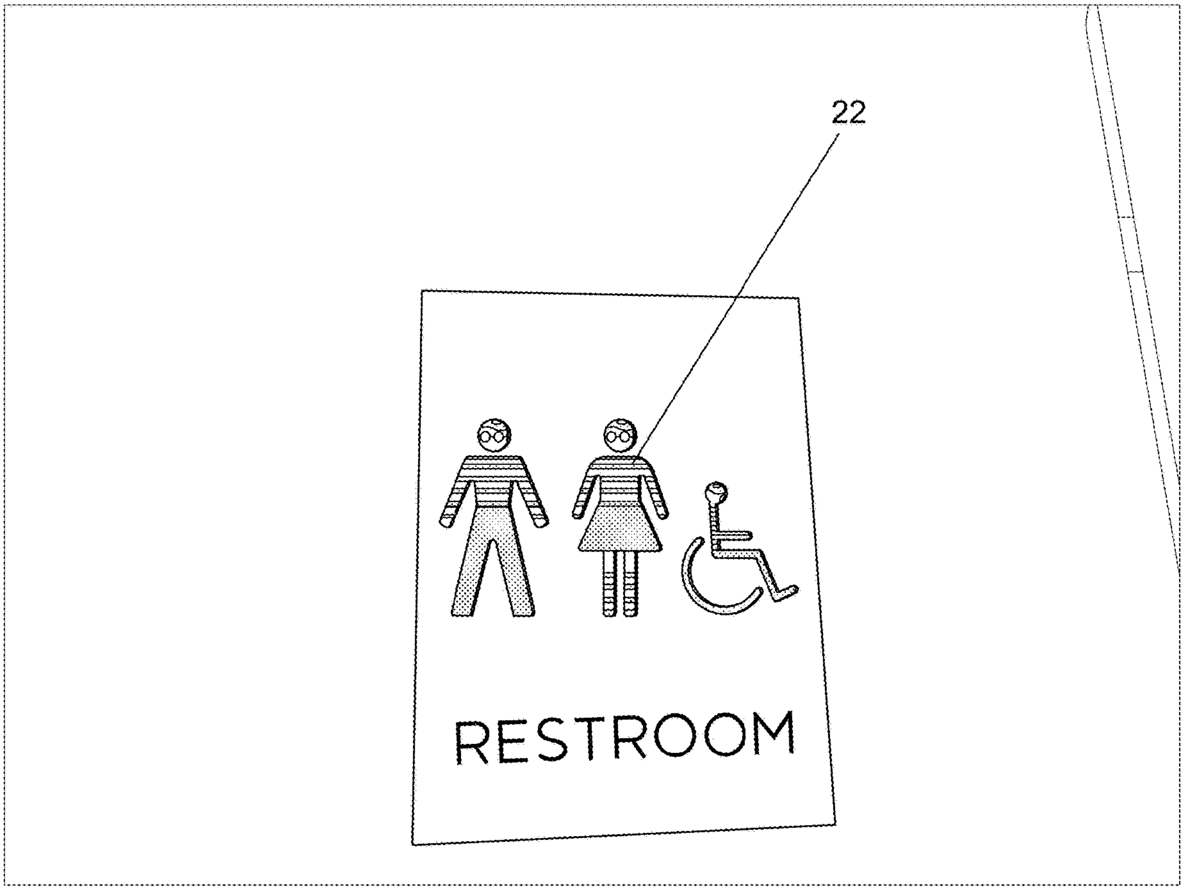
Figure 9:
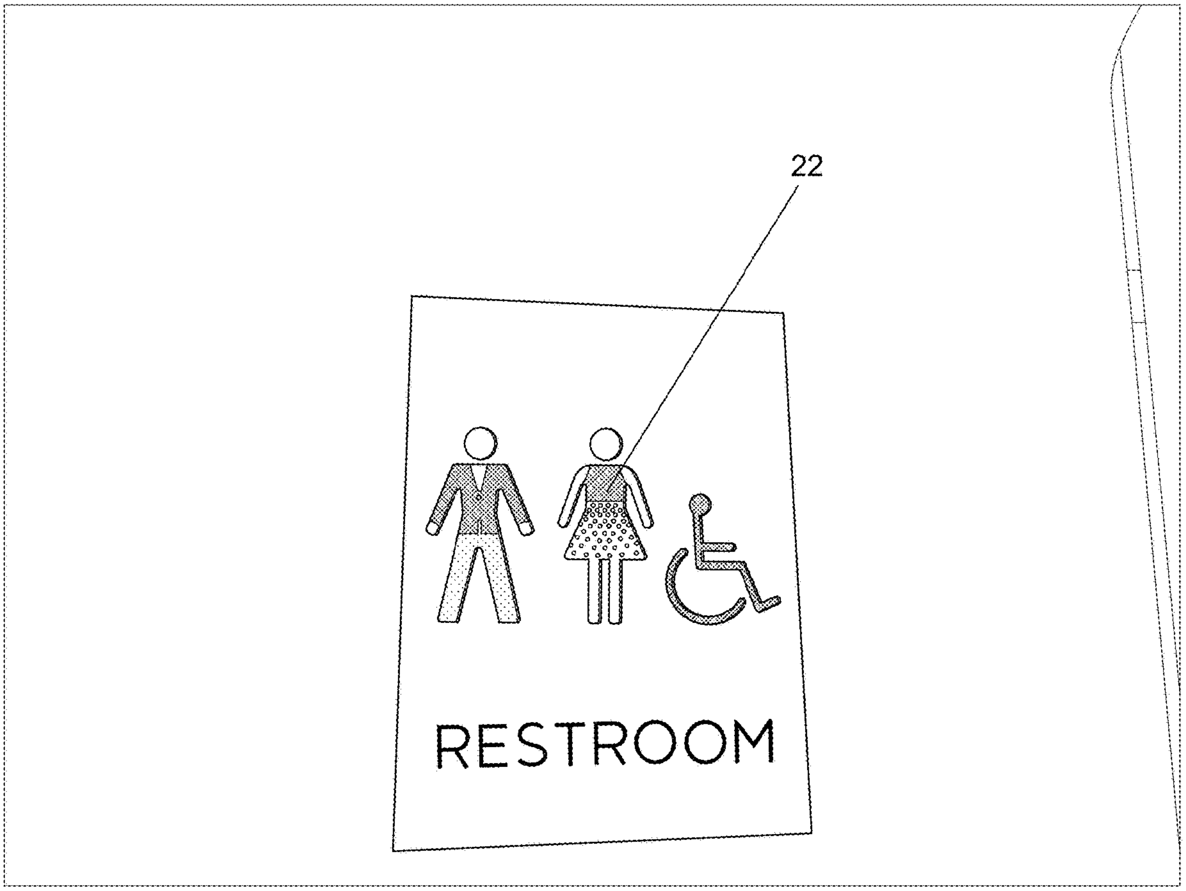
Figure 10:
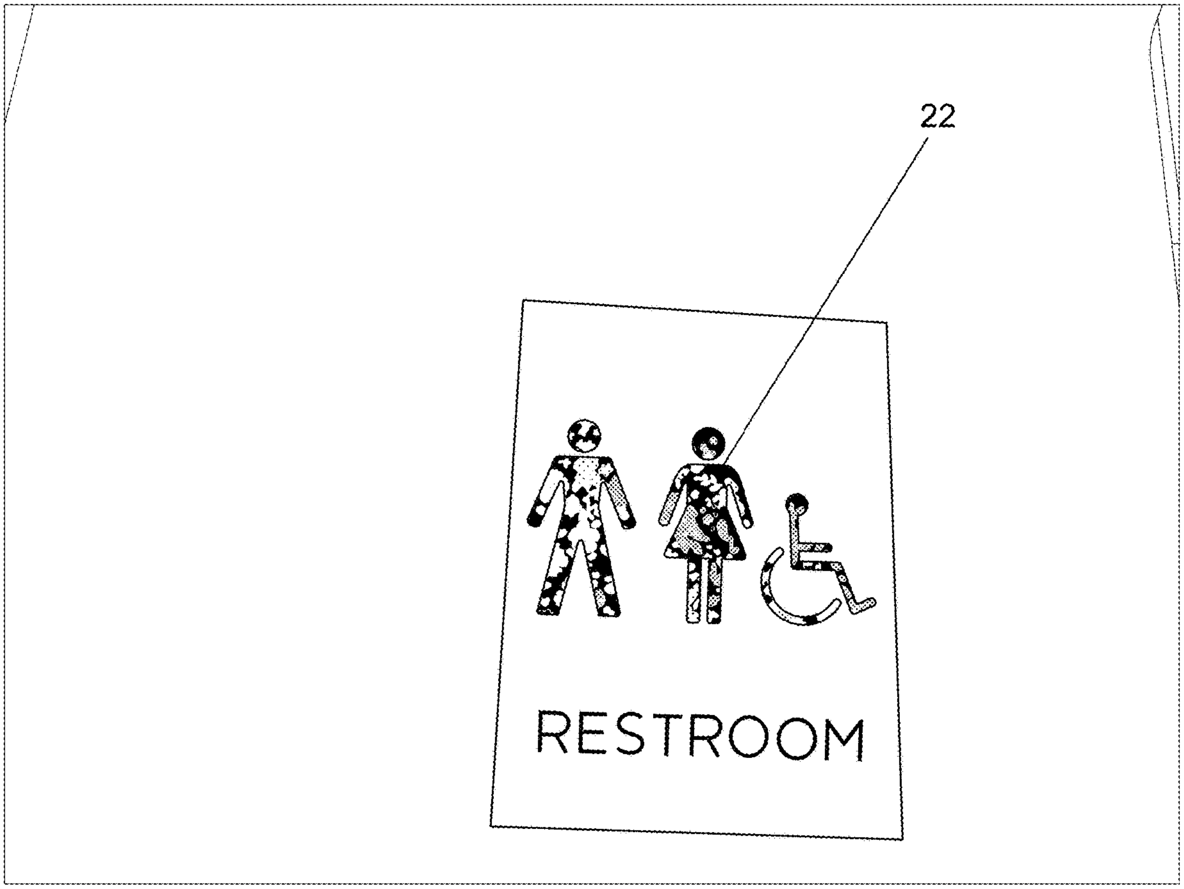
Figure 11:
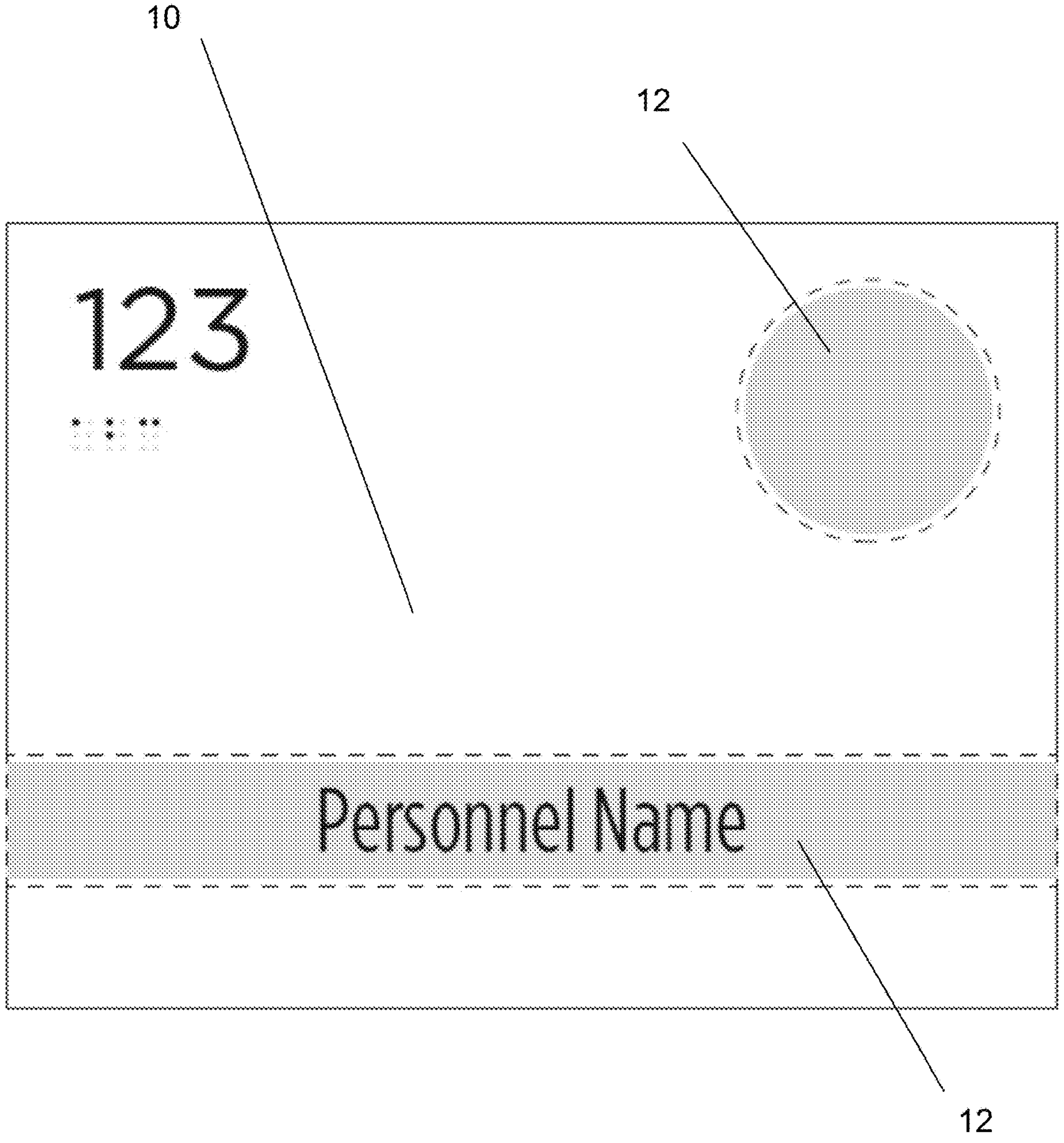
FIG. 11 shows an example of another embodiment of a sign with two transparent and/or cut-out areas.
Figure 12:
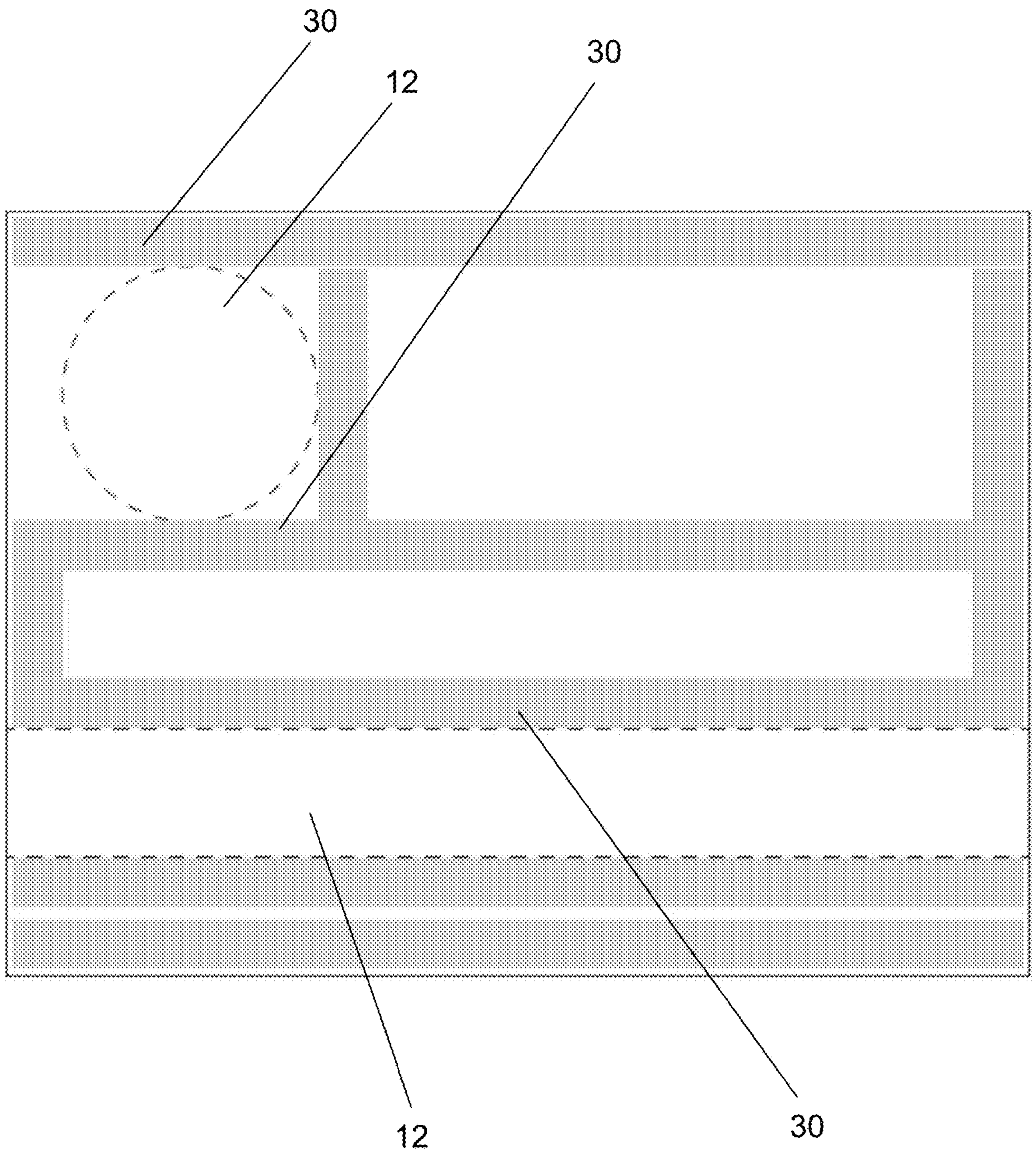
FIGS. 12-13 shows back views of the sign of FIG. 11 with multiple holders.
Figure 13:
Figure 14:
FIGS. 14-20 show front views of the sign of FIG. 11 with various inserts.
Figure 15:
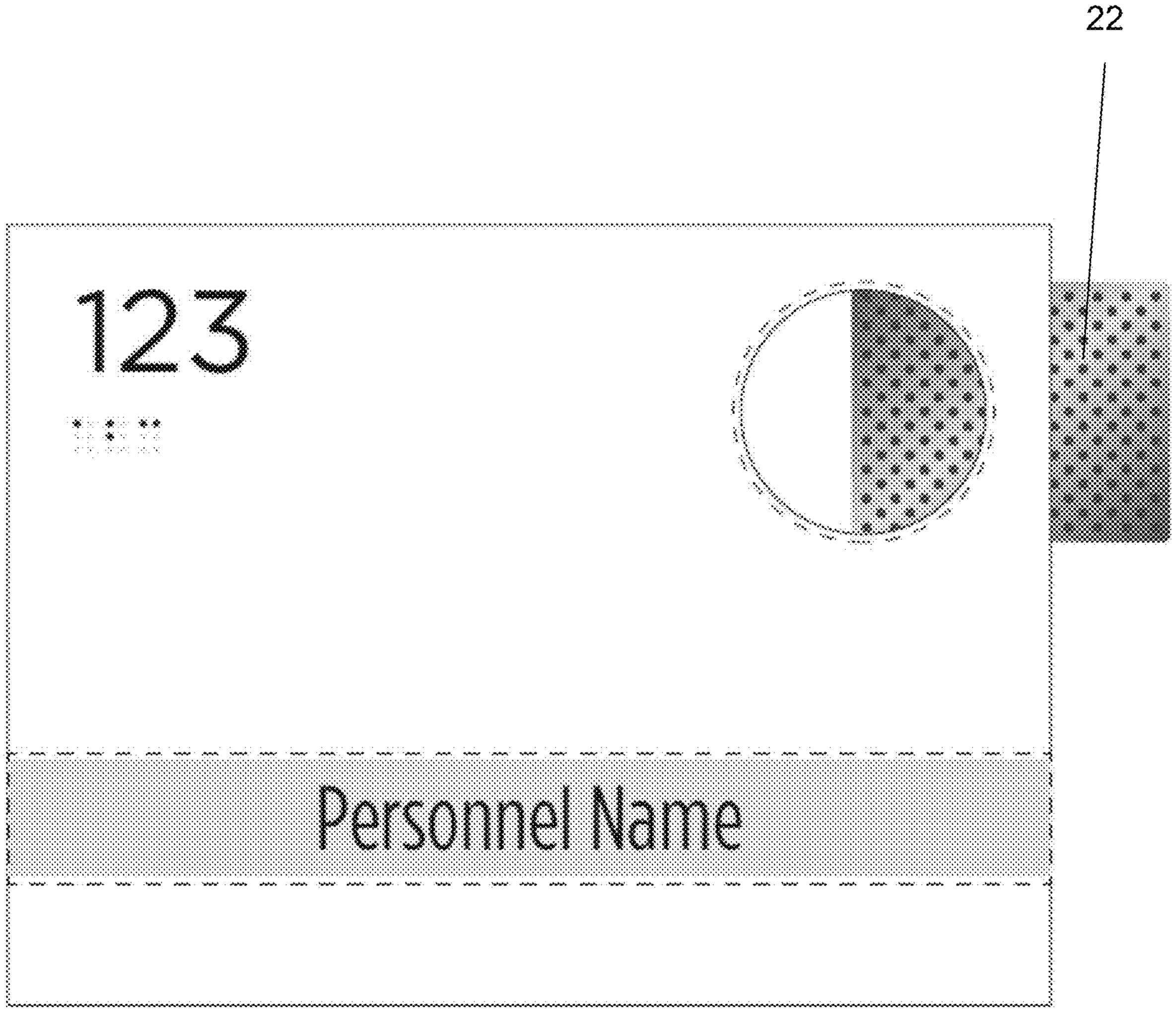
Figure 16:
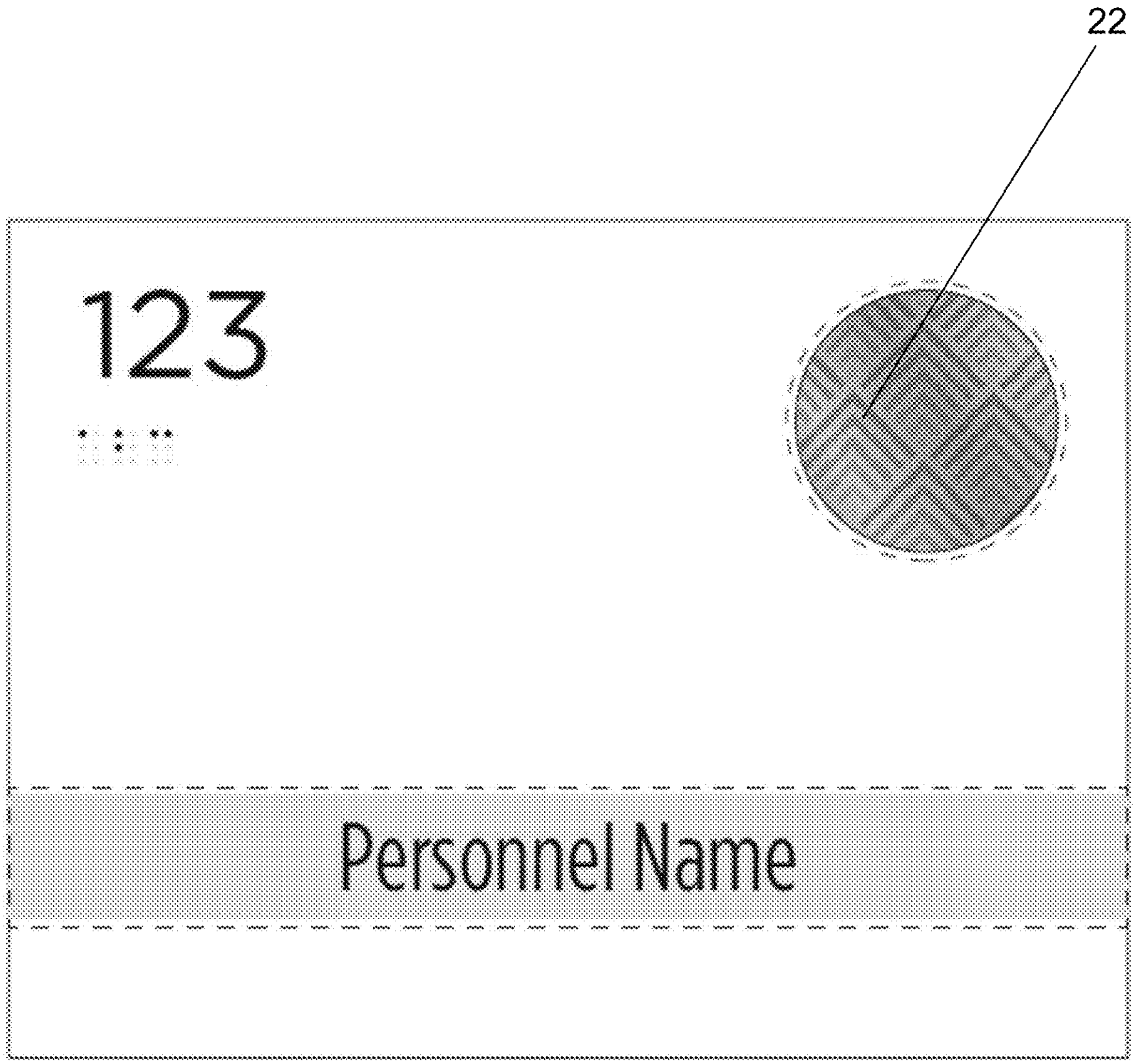
Figure 17:
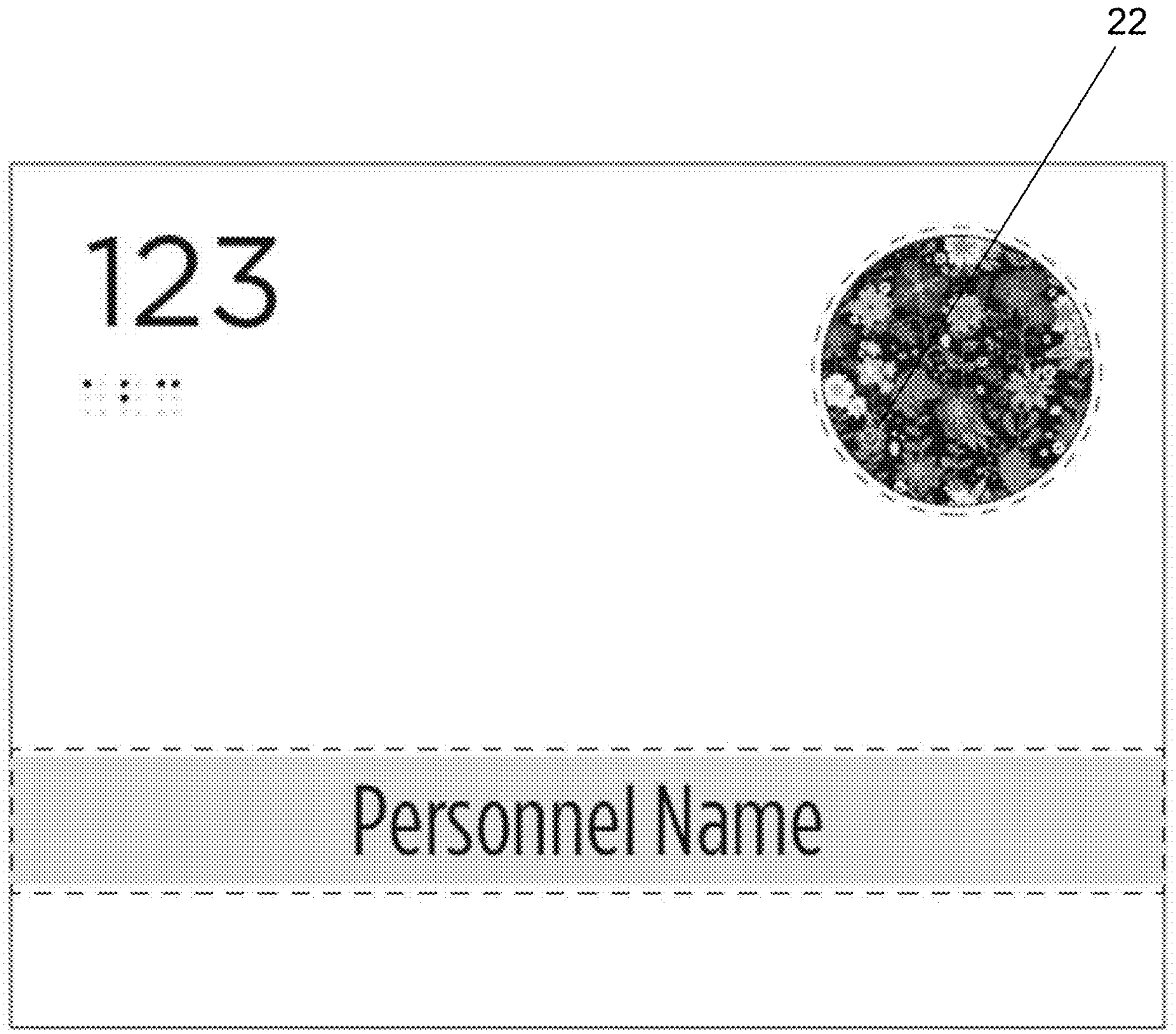
Figure 18:
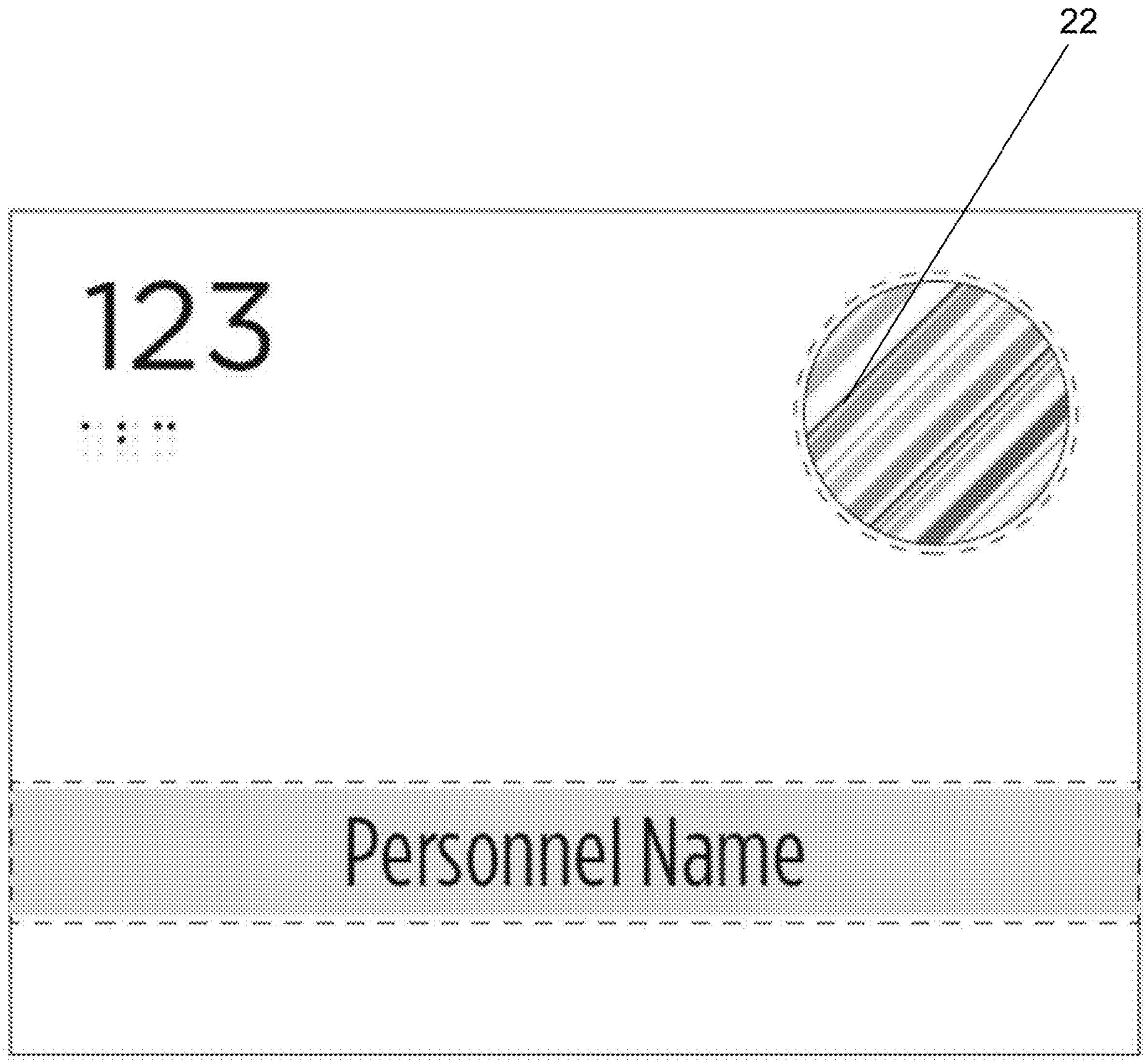
Figure 19:
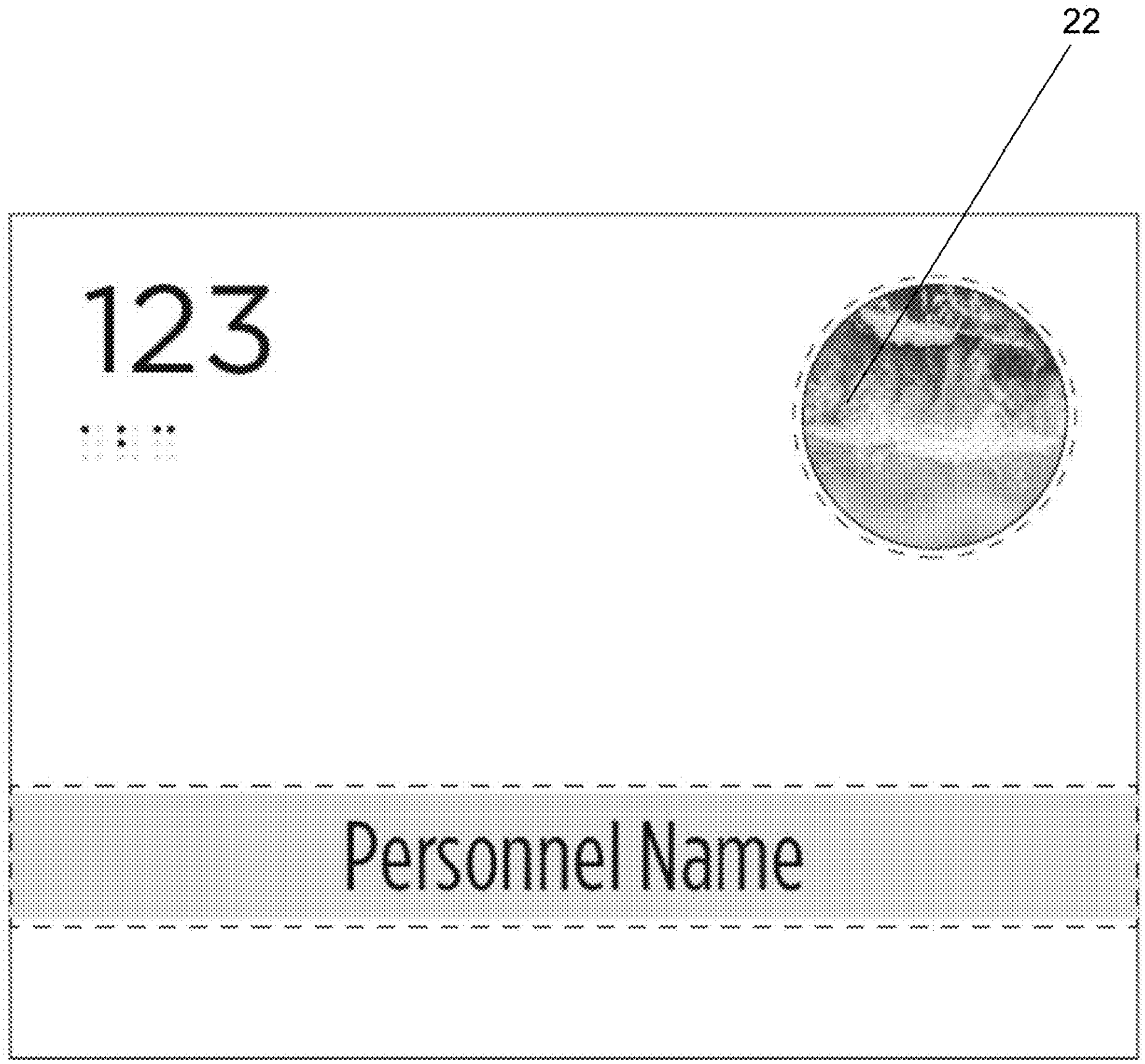
Figure 20:
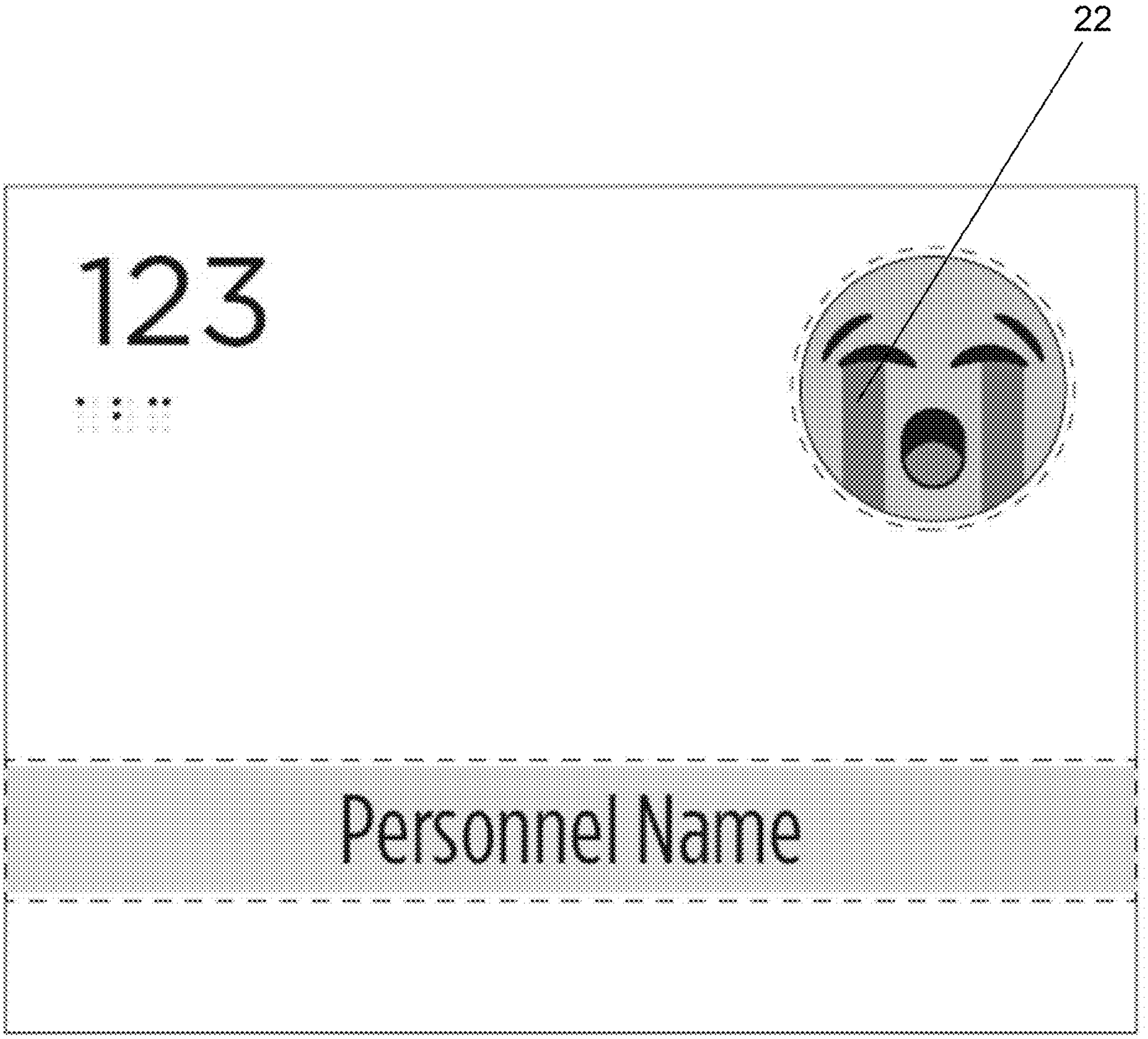
Figure 21:
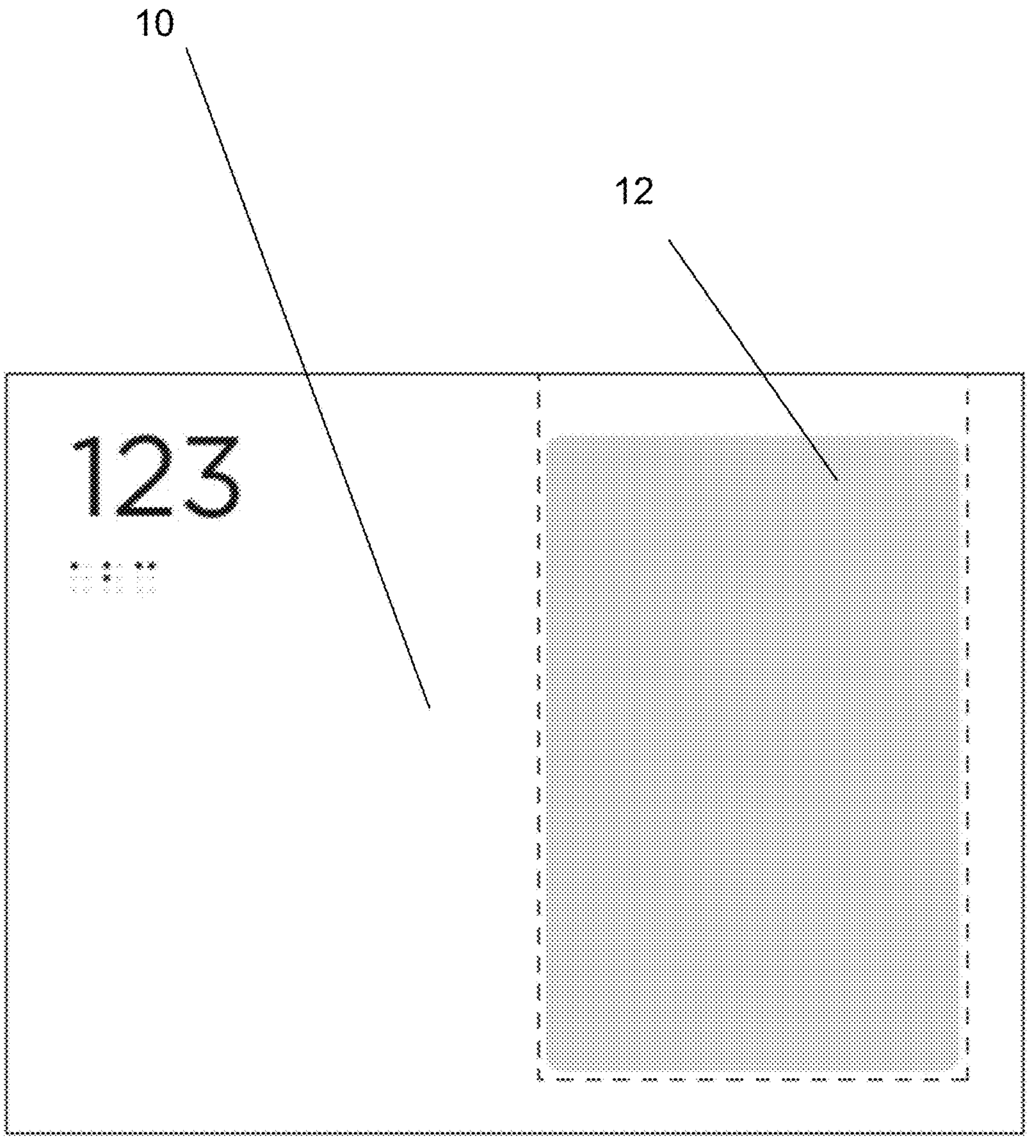
FIG. 21 shows an example of another embodiment of a sign with two transparent and/or cut-out areas.
Figure 22:
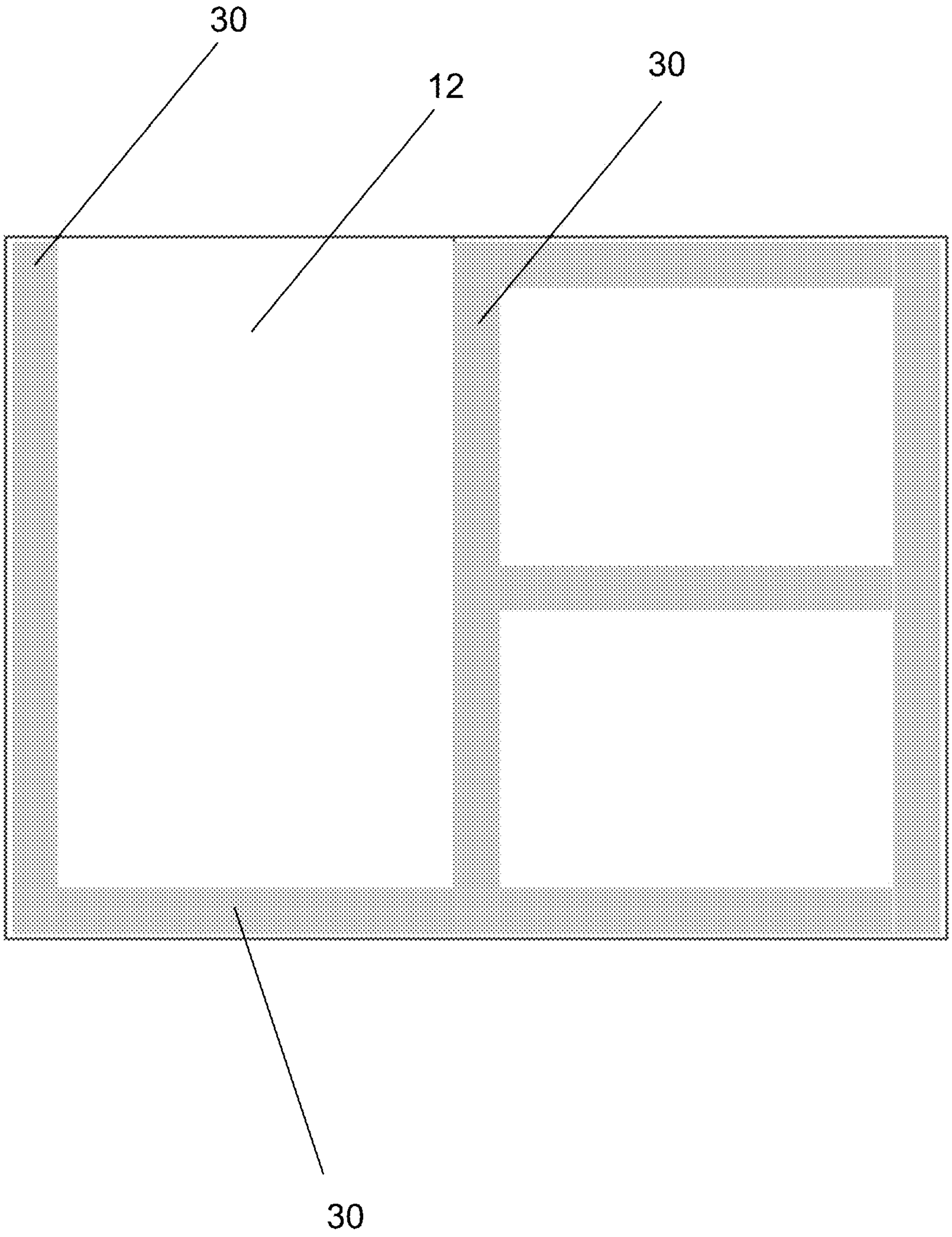
FIGS. 22-23 shows back views of the sign of FIG. 21 with multiple holders.
Figure 23:
Figure 24:
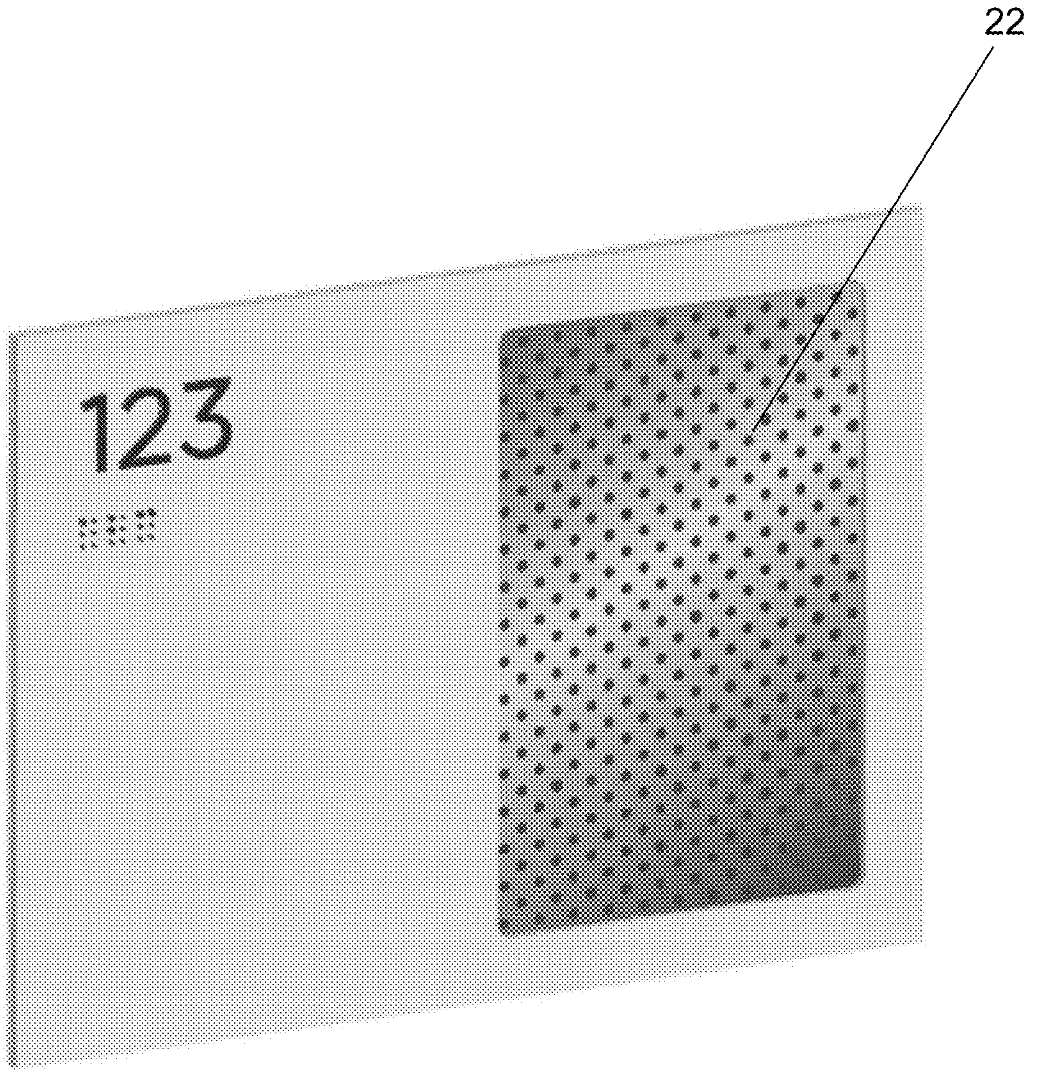
FIGS. 24-30 show front views of the sign of FIG. 21 with various inserts.
Figure 25:
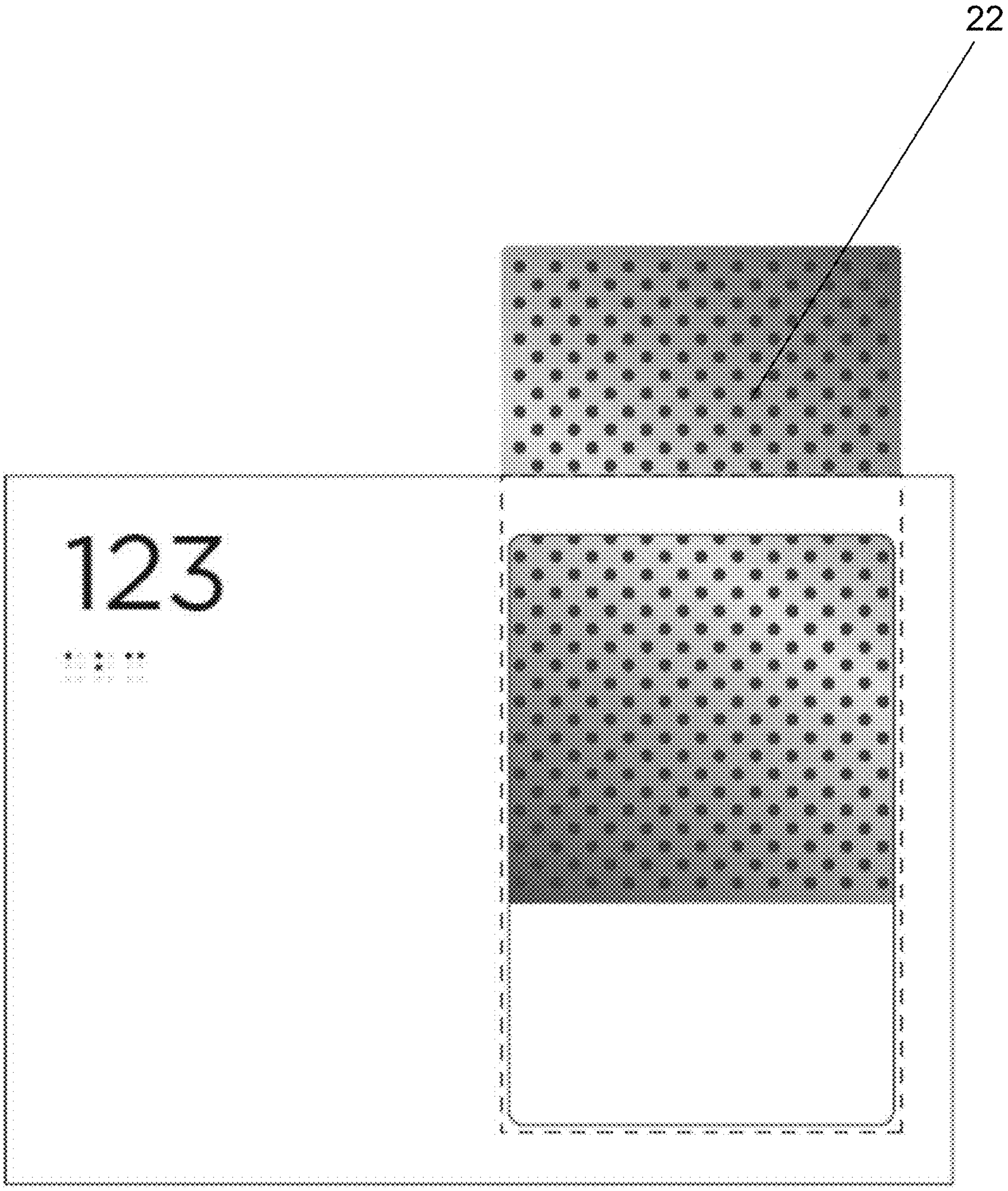
Figure 26:
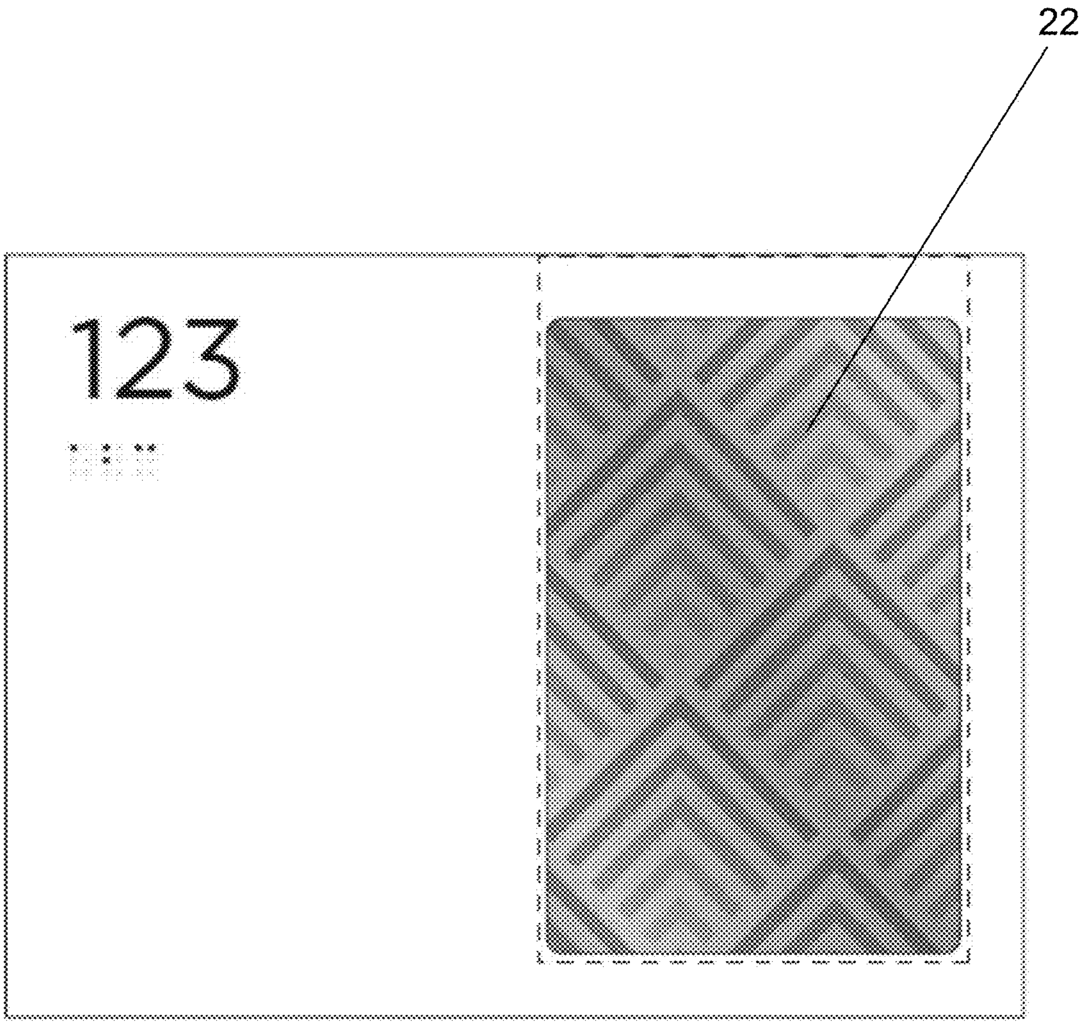
Figure 27:
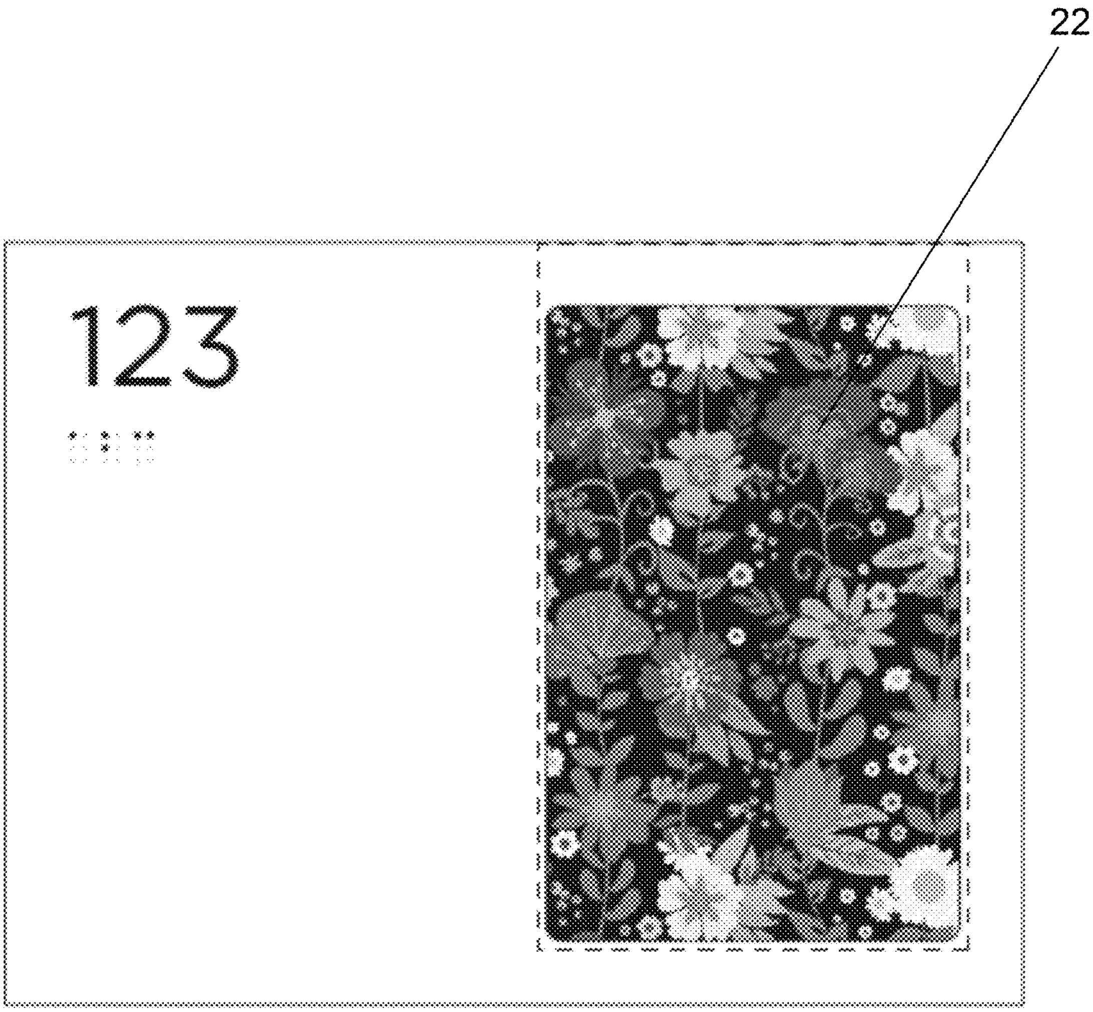
Figure 28:
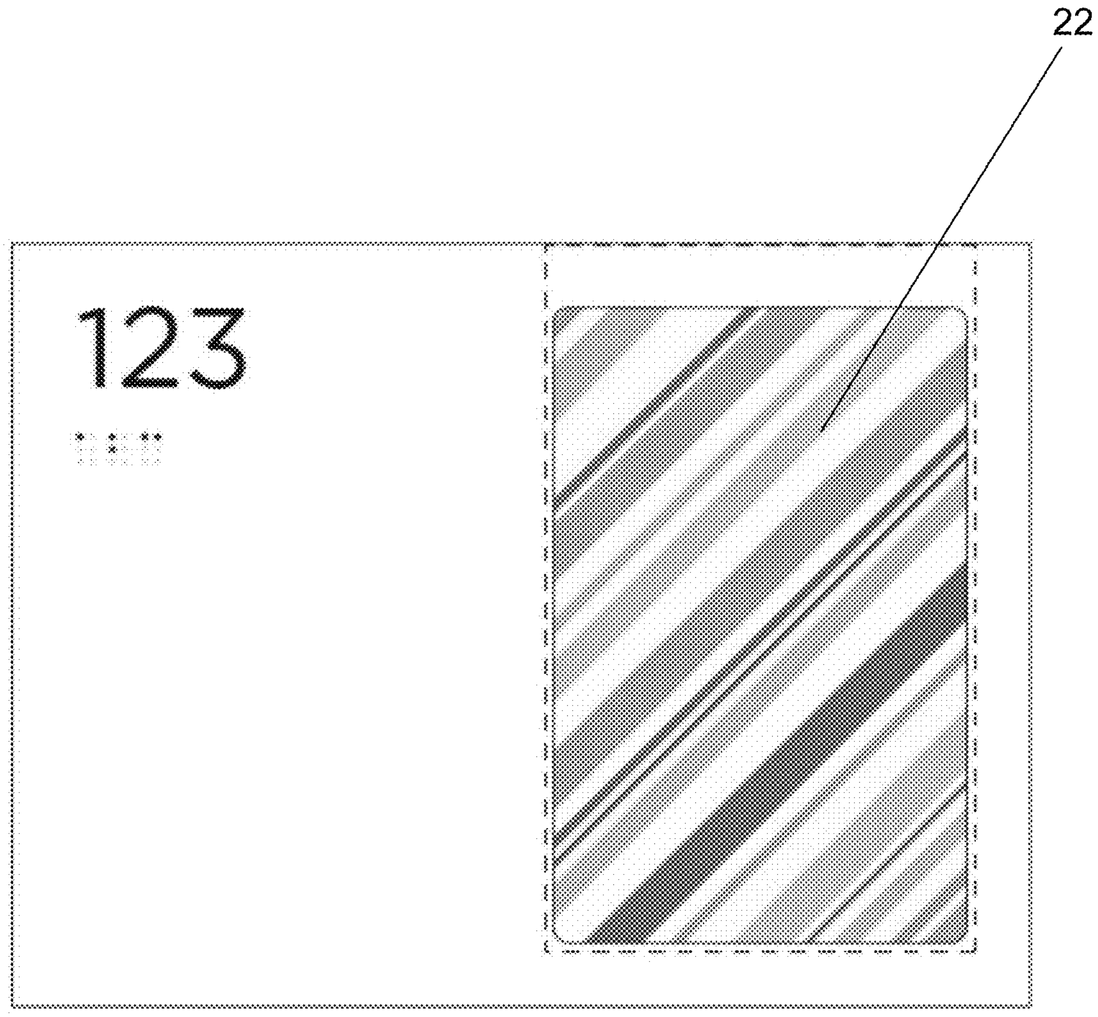
Figure 29:
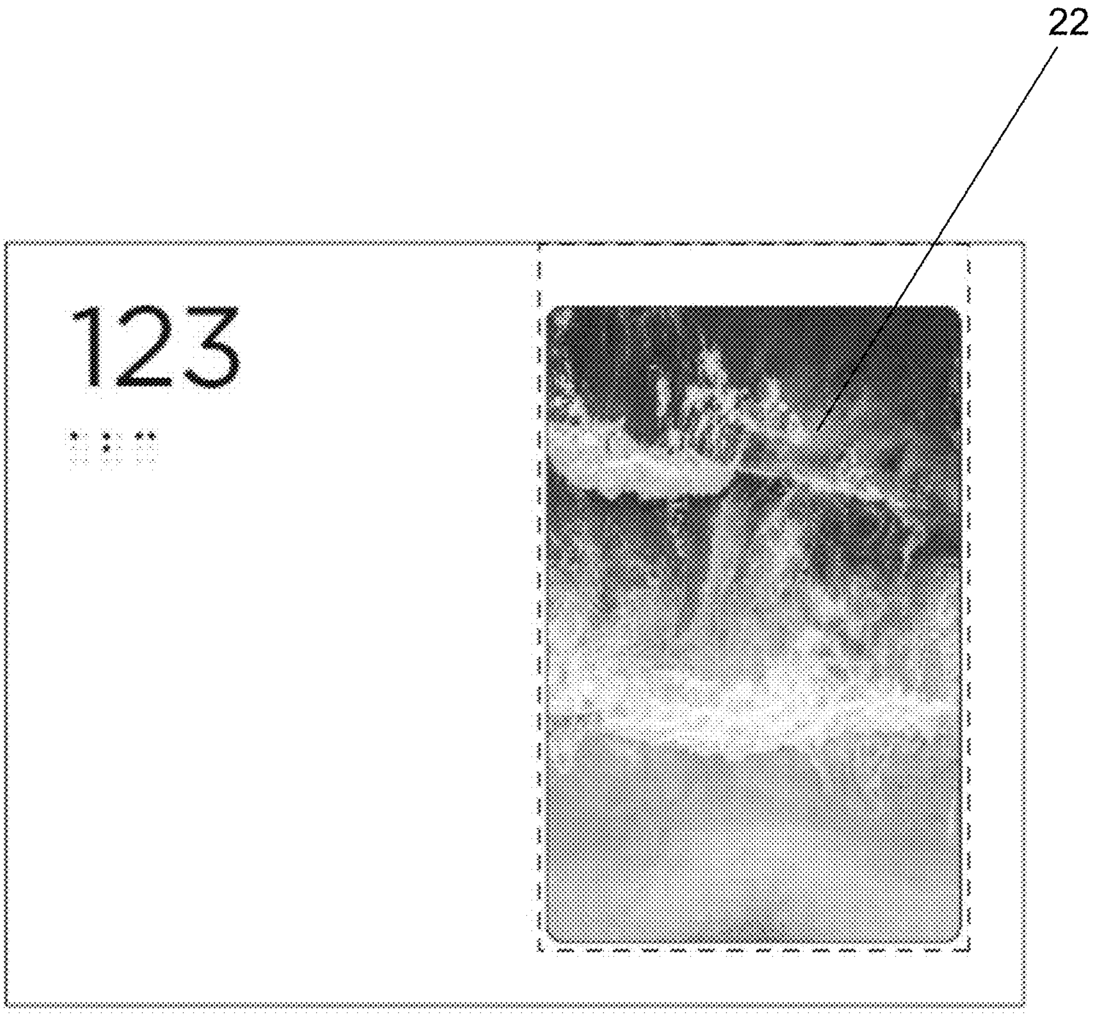
Figure 30:
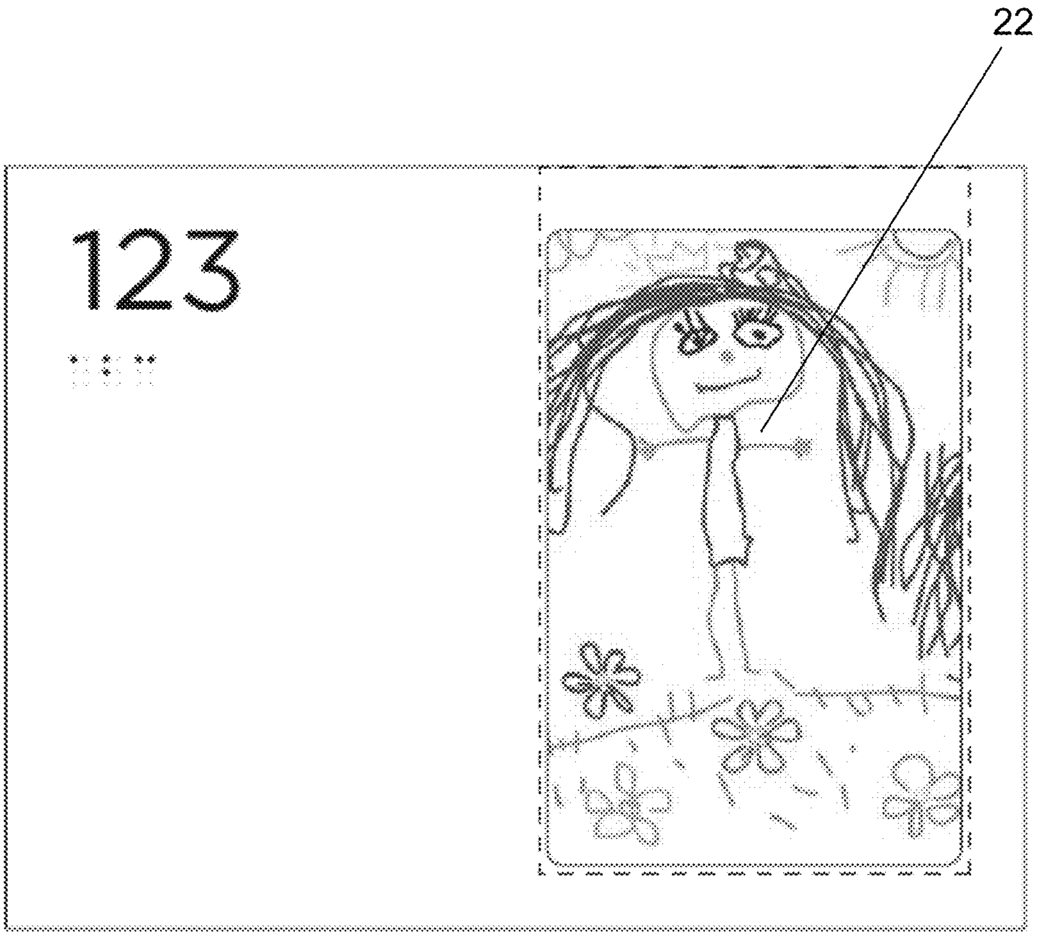

Inserts may comprise one or more colors, images, or patterns, or combinations thereof. Inserts may comprise a single color, image or pattern, or these may be arranged so that particular parts of a color, image or pattern show through the cut-outs. As seen in FIGS. 8 and 9, for example, the colors, images and patterns that show through create the appearance of different articles of clothing on the male and female cut-outs. FIG. 10, in contrast, shows a floral pattern that simply shows through the cut-outs. Inserts may include artwork or images of any type, including hand-drawn art, as seen in FIG. 31.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A method for altering an appearance of a bathroom sign that is attached to a wall adjacent to a bathroom, the bathroom sign having a cut-out extending between a front side of the sign and a back side of the sign, the cut-out having a shape representing an image of a person that is visible from the front side, the method comprising:

while the bathroom sign remains attached to the wall, removing a first removable insert from a space located behind the back side of the sign, the first removable insert including a first ornamental pattern that is visible through the cut-out to create a first appearance to the image of the person; and after the removing and while the bathroom sign remains attached to the wall, inserting a second removable insert into the space behind the back side of the sign, the second removable insert including a second ornamental pattern that is visible through the cut-out to create a second appearance to the image of the person, the first ornamental pattern being different from the second ornamental pattern.

2. The method of claim 1, wherein the second ornamental pattern creates the appearance of clothing on the image of the person.

3. The method of claim 1, wherein the first ornamental pattern includes a first color and the second ornamental pattern includes a second color, the first color being different from the second color.

4. The method of claim 1, wherein the inserting includes moving the second removable insert in a vertical direction to the space located behind the back side of the sign.

5. The method of claim 1, wherein the second ornamental pattern includes a holiday theme.

6. The method of claim 1, wherein the second ornamental pattern includes a seasonal theme.

7. The method of claim 1, wherein the space is partially defined by at least two holding structures that attach the sign to a wall.

8. The method of claim 7, wherein the holding structures are pieces of tape.

9. The method of claim 1, wherein the space is partially defined by a sleeve or a panel in which the insert is inserted.

10. The method of claim 1, wherein the space is configured to simultaneously hold the first and second removable inserts such that the first removable insert is stored within the space while the second removable insert is visible through the cut-out to create the second appearance to the image of the person.

11. The method of claim 1, further including inserting a third removable insert to the space behind the back side of the sign.

12. The method of claim 1, further including a second cut-out having a shape representing a second image of a second person that is visible from the front side, the second ornamental pattern of the second removable insert being visible through the second cut-out.

13. A method for altering an appearance of a bathroom sign attached to a wall, the bathroom sign having a cut-out extending between a front side of the sign and a back side of the sign, the cut-out having a shape representing an image of a person that is visible from the front side, the method comprising:

without removing the bathroom sign from the wall, inserting a first removable insert into a space located behind the back side of the sign, the first removable insert including a first ornamental pattern that is visible through the cut-out to create a new appearance of clothing located on the image of the person.

14. The method of claim 13, wherein the first ornamental pattern creates the appearance of clothing with a holiday theme.

15. The method of claim 13, wherein the first ornamental pattern creates the appearance of clothing with a seasonal theme.

16. The method of claim 13, wherein the space is partially defined by at least two holding structures that attach the sign to a wall.

17. The method of claim 13, further including, without removing the sign from the wall, inserting a second removable insert into the space located behind the back side of the sign, the second removable insert including a second ornamental pattern that is visible through the cut-out to create a second new appearance to the image of the person.

18. A kit for altering an appearance of a bathroom sign having a back side that is attached to a wall, the bathroom sign having a cut-out extending between a front side of the sign and the back side of the sign, the cut-out having a shape representing an image of a person that is visible from the front side, the kit comprising:

a first removable insert configured to be inserted into a space located between the back side of the sign and the wall, the first removable insert including a first ornamental pattern that is visible through the cut-out to create a first appearance of clothing on the image of the person; and a second removable insert configured to be inserted into the space located between the back side of the sign and the wall, the second removable insert including a second ornamental pattern that is visible through the cut-out to create a second appearance of clothing on the image of the person, the first ornamental pattern being different from the second ornamental pattern.

19. The kit of claim 18, wherein the second ornamental pattern of the second removable insert creates the second appearance of holiday clothing on the image of the person.

20. The kit of claim 19, wherein the holiday clothing is located on only part of the image of the person.

* * * * *